United States Patent
Helou, Jr. et al.

(10) Patent No.: US 8,658,714 B2
(45) Date of Patent: Feb. 25, 2014

(54) ECOLOGICALLY FRIENDLY COMPOSITION CONTAINING BENEFICIAL ADDITIVES

(75) Inventors: Elie Helou, Jr., Santa Barbara, CA (US); David A. Dellinger, Santa Barbara, CA (US); Dwight W. Schwark, Simpsonville, SC (US); Drew V. Speer, Simpsonville, SC (US)

(73) Assignee: Biosphere Industries, LLC, Carpinteria, CA (US)

( * ) Notice: Subject to any disclaimer, the term of this patent is extended or adjusted under 35 U.S.C. 154(b) by 104 days.

(21) Appl. No.: 12/755,305

(22) Filed: Apr. 6, 2010

(65) Prior Publication Data

US 2010/0280149 A1 Nov. 4, 2010

Related U.S. Application Data

(60) Provisional application No. 61/167,092, filed on Apr. 6, 2009.

(51) Int. Cl.
*C08K 3/08* (2006.01)
*C08K 3/10* (2006.01)
*C08K 3/18* (2006.01)
*C08K 3/22* (2006.01)
*C08K 3/30* (2006.01)
*C08L 91/00* (2006.01)
*C08L 91/06* (2006.01)

(52) U.S. Cl.
USPC ........... 523/128; 524/403; 524/406; 524/413; 524/420; 524/430; 524/431; 524/432; 524/433; 524/437; 524/439

(58) Field of Classification Search
USPC .......... 523/128; 524/403, 406, 413, 420, 430, 524/431, 432, 433, 437, 439
See application file for complete search history.

(56) References Cited

U.S. PATENT DOCUMENTS

| | | |
|---|---|---|
| 3,772,076 A | 11/1973 | Keim |
| 5,100,586 A | 3/1992 | Jennings et al. |
| 5,169,566 A | 12/1992 | Stucky et al. |
| 5,205,863 A | 4/1993 | Elion |
| 5,232,496 A | 8/1993 | Jennings et al. |
| 5,352,111 A | 10/1994 | Selbak |
| 5,354,621 A | 10/1994 | Liebermann |
| 5,356,579 A | 10/1994 | Jennings et al. |
| 5,358,676 A | 10/1994 | Jennings et al. |
| 5,376,320 A | 12/1994 | Tiefenbacher et al. |
| 5,385,764 A | 1/1995 | Andersen et al. |
| 5,412,005 A | 5/1995 | Bastioli |
| 5,453,310 A | 9/1995 | Andersen et al. |
| 5,506,046 A | 4/1996 | Andersen et al. |
| 5,508,072 A | 4/1996 | Andersen et al. |
| 5,514,430 A | 5/1996 | Andersen et al. |
| 5,523,293 A | 6/1996 | Jane |
| 5,527,387 A | 6/1996 | Andersen et al. |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,580,409 A | 12/1996 | Andersen et al. |
| 5,580,624 A | 12/1996 | Andersen et al. |
| 5,582,670 A | 12/1996 | Andersen et al. |
| 5,614,307 A | 3/1997 | Andersen et al. |
| 5,618,341 A | 4/1997 | Anderson et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,635,292 A | 6/1997 | Jennings et al. |
| 5,637,412 A | 6/1997 | Jennings et al. |
| 5,641,584 A | 6/1997 | Andersen et al. |
| 5,654,048 A | 8/1997 | Andersen et al. |
| 5,658,603 A | 8/1997 | Andersen et al. |
| 5,658,624 A | 8/1997 | Anderson et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Anderson et al. |
| 5,665,152 A | 9/1997 | Bassi et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Anderson et al. |

(Continued)

FOREIGN PATENT DOCUMENTS

CA 2317023 A1 5/2001
GB 1476764 6/1977

(Continued)

OTHER PUBLICATIONS

Ducey et al, "Alkaline sizing applications surge ahead," Alkaline Paper Advocate, Oct. 1, 1996.

(Continued)

*Primary Examiner* — Kriellion Sanders
(74) *Attorney, Agent, or Firm* — Perkins Coie LLP; Joseph P. Hamilton

(57) ABSTRACT

One embodiment is a composition comprising water; starch; natural fibrous materials; one or more additives to improve certain properties such as heat transfer, microbial resistance, scavenging activity or shelf life; a mold release agent; flavoring agents; coloring agents; and/or wax emulsions, proteins, or other natural polymeric compounds to adjust the product properties for particular applications.

24 Claims, No Drawings

(56) References Cited

U.S. PATENT DOCUMENTS

| | | |
|---|---|---|
| 5,679,381 A | 10/1997 | Andersen et al. |
| 5,683,772 A | 11/1997 | Andersen et al. |
| 5,691,014 A | 11/1997 | Andersen et al. |
| 5,693,355 A | 12/1997 | Haas |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Tiefenbacher et al. |
| 5,714,217 A | 2/1998 | Andersen et al. |
| 5,716,675 A | 2/1998 | Andersen et al. |
| 5,720,913 A | 2/1998 | Andersen et al. |
| 5,736,209 A | 4/1998 | Andersen et al. |
| 5,738,921 A | 4/1998 | Andersen et al. |
| 5,753,308 A | 5/1998 | Andersen et al. |
| 5,766,525 A | 6/1998 | Andersen et al. |
| 5,776,388 A | 7/1998 | Andersen et al. |
| 5,783,126 A | 7/1998 | Andersen et al. |
| 5,786,080 A | 7/1998 | Andersen et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,851,634 A | 12/1998 | Andersen et al. |
| 5,868,824 A | 2/1999 | Andersen et al. |
| 5,922,379 A * | 7/1999 | Wang .......................... 426/138 |
| 5,928,741 A | 7/1999 | Andersen et al. |
| 5,973,082 A | 10/1999 | Elmore |
| 5,976,235 A | 11/1999 | Andersen et al. |
| 6,030,673 A | 2/2000 | Andersen et al. |
| 6,083,586 A | 7/2000 | Andersen et al. |
| 6,090,195 A | 7/2000 | Andersen et al. |
| 6,146,573 A | 11/2000 | Shogren et al. |
| 6,168,857 B1 | 1/2001 | Andersen et al. |
| 6,180,037 B1 | 1/2001 | Andersen et al. |
| 6,200,404 B1 | 3/2001 | Andersen et al. |
| 6,228,898 B1 | 5/2001 | Nakanishi |
| 6,231,970 B1 | 5/2001 | Andersen et al. |
| 6,277,899 B1 | 8/2001 | Bastioli |
| 6,337,097 B1 | 1/2002 | Sun et al. |
| 6,347,934 B1 | 2/2002 | Andersen et al. |
| 6,379,446 B1 | 4/2002 | Andersen et al. |
| 6,494,704 B1 | 12/2002 | Andersen et al. |
| 6,585,859 B1 | 7/2003 | Hakansson |
| 6,589,327 B1 | 7/2003 | Snidow |
| 6,846,573 B2 | 1/2005 | Seydel |
| 6,878,199 B2 | 4/2005 | Bowden et al. |
| 7,083,673 B2 | 8/2006 | Bowden et al. |
| 7,196,124 B2 | 3/2007 | Parker et al. |
| 2003/0047110 A1 | 3/2003 | Poovarodom et al. |
| 2003/0143417 A1 | 7/2003 | Kesselring et al. |
| 2003/0216492 A1 | 11/2003 | Bowden et al. |
| 2005/0089606 A1 | 4/2005 | Dellinger |
| 2006/0075544 A1 | 4/2006 | Kriesel et al. |
| 2006/0110498 A1 | 5/2006 | Dellinger |
| 2006/0229207 A1 * | 10/2006 | Mentink et al. ............... 504/292 |
| 2006/0255507 A1 | 11/2006 | Bowden et al. |
| 2007/0021534 A1 | 1/2007 | Glenn et al. |
| 2007/0234965 A1 | 10/2007 | Aguilar et al. |
| 2007/0243346 A1 | 10/2007 | Kim |
| 2010/0311874 A1 * | 12/2010 | Mentink et al. ................ 524/48 |

FOREIGN PATENT DOCUMENTS

| | | |
|---|---|---|
| GB | 2398055 A | 8/2004 |
| JP | 08-081565 | 3/1996 |
| JP | 10-245792 | 9/1998 |
| JP | 11-222794 | 8/1999 |
| WO | WO97/23333 | 7/1997 |
| WO | WO99/45073 A | 9/1999 |
| WO | WO00/39213 | 6/2000 |
| WO | WO00/39215 A | 7/2000 |
| WO | WO2005/021633 | 10/2005 |
| WO | WO2006/102710 A1 | 10/2006 |

OTHER PUBLICATIONS

European Patent Office, EP Examination Report for EP04782322.4, Sep. 23, 2009.

European Patent Office, EP Supplemental Search Report and Search Opinion for EP 06827369.7, Oct. 7, 2009.

European Patent Office, EP Supplemental Search Report for EP 04782322, Jun. 10, 2009.

European Patent Office, Extended European Search Report for EP 08842589, Sep. 27, 2011.

Hagenmaier et al., Wax microemulsions . . . , J. Agri Food Chem, 42, 899-902., 1994.

Japanese Patent Office, JP Office Action (English Translation) for JP 2006-524867, Dec. 8, 2009.

United States Patent and Trademark Office, International Search Report and Written Opinion for PCT/US04/27824, Aug. 29, 2008.

United States Patent and Trademark Office, International Search Report and Written Opinion for PCT/US06/42800, May 2, 2007.

United States Patent and Trademark Office, International Search Report and Written Opinion for PCT/US08/69266, Oct. 2, 2008.

United States Patent and Trademark Office, International Search Report and Written Opinion for PCT/US08/80979, Dec. 24, 2008.

United States Patent and Trademark Office, International Search Report and Written Opinion for PCT/US10/30124, USPTO, Jun. 4, 2010.

* cited by examiner

ECOLOGICALLY FRIENDLY COMPOSITION CONTAINING BENEFICIAL ADDITIVES

CROSS-REFERENCE TO RELATED APPLICATIONS

This application claims the benefit of U.S. Provisional Application No. 61/167,092, filed Apr. 6, 2009, which is incorporated herein by reference in its entirety.

BACKGROUND

One method currently used to address environmental concerns for conventional disposable food container products is the manufacture of starch-based disposable items such as packaging containers, trays, plates, and bowls. It is desirous to improve the properties of such materials for specific applications such a food service.

Accordingly, there is a need for an improved system for producing ecofriendly disposable packaging items that can serve the full range of uses to which containers, plates, trays, and bowls are usually put.

SUMMARY

One embodiment is a composition comprising water; starch; natural fibrous materials; one or more additives to improve certain properties such as heat transfer, microbial resistance, scavenging activity or shelf life; a mold release agent; flavoring agents; coloring agents; and/or wax emulsions, proteins, or other natural polymeric compounds to adjust the product properties for particular applications.

DETAILED DESCRIPTION

In order to fully understand the manner in which the above-recited details and other advantages and objects according to the invention are obtained, a more detailed description of the invention will be rendered by reference to specific embodiments thereof.

One embodiment provides packaging material that is edible and is much stronger than standard ice cream cone formulations, while remaining functional in oven and microwave environments. Typical envisioned applications for the present embodiment include stronger ice cream cones, pie shells, muffin trays, hot dog holders, candy trays, ice cream trays, cookie holders, and dessert trays. Products with enhanced moisture resistance can be provided by coating the tray with an edible, moisture resistant coating. Where long term storage of food products requires a sealed moisture and oxygen barrier, conventional coated paper or plastic film materials can be used for barrier materials, with a rigid edible, compostable, and biodegradable insert acting to hold and protect the food items.

Pet food containers can also be produced according to the present embodiment. These containers are not only edible, but (unlike many conventional packaging materials) are safe for pets' teeth as well. This new pet edible packaging can be flavored to act as a "treat" after the pet has finished eating the meal, or served as part of the meal itself. Elimination of pet food packaging would provide pets with an additional source of dietary fiber, reduce the amount of pet food packaging material in the waste stream currently being sent to landfills, and increase the overall efficiency of pet food delivery by eliminating waste packaging material.

In one embodiment, a formulation according to some embodiments from which edible packaging items (containers, plates, trays, bowls, cones, and cups, as well as other novel shapes) can be produced is provided comprising water; starch; optionally several natural fibrous materials used in combination both as structural elements (at several size scales) in the baked items and as inexpensive organic replacements for inorganic fillers; optionally proteins and natural polymeric compounds to reduce the brittleness of the articles produced for use in dry environments and to prevent breakage immediately after forming when the items are typically dry; optionally wax emulsions to increase water-resistance of the finished items; optionally a mold release agent to reduce adhesion between baked parts and the mold system; and optionally food grade coloring and/or flavoring agents to increase the sensory appeal of the items.

In another embodiment, the formulation according to the above embodiment can additionally and optionally comprise additives to improve various properties of the formulation such as heat transfer, scavenging properties, shelf life, and bacterial or other microbial resistance.

Starch for use in some embodiments may include, but is not limited to, plant sources such as tubers, roots, seeds, and or fruits of plants, and specific plants sources may include corn, potato, tapioca, rice, or wheat or similar, or animal sources, namely glycogen, although plant sources are most preferred. Further, the starch is preferably provided as a combination of both pregelatinized and uncooked starches. Preferably, pregelatinized starch has a concentration in the range of about 0% to about 30% by weight of total starch in the formulation, and more preferably 3% to 20%, and most preferably 5% to 15%. Food-grade starches (pregelatinized or uncooked) that have been modified by cross-linking, stabilization, or addition of lipophilic functional groups may be included to increase resistance of the products to softening when exposed to aqueous foods.

Proteins and natural polymeric compounds that used in some embodiments may include, but are not limited to preparations made from casein, soy protein isolate or concentrate, or similar such preparations. One such preparation can be prepared in the following three steps: 1) cooking a solution of casein or soy protein isolate in water (about 10% by weight) as per usual manufacturer's recommendations (generally, hydrating the protein by soaking, then gradually raising the temperature and pH of the solution to 180° F. and pH=9 to 9.5, then holding the solution at 180° F. for 15 minutes); 2) cooling the preparation to room temperature; and optionally, 3) adding a preservative and blending thoroughly. The preferred concentration of preservative in the preparation is about 0.1% or less, depending on the shelf life required for the protein solution, the concentration of protein required in the final product, and the limits imposed by government regulations on the dosages of preservative compounds in edible materials.

Other proteins may also be used in combination with the casein or soy protein preparation or separately to improve the water-resistant properties of the containers. For example, such proteins may include albumen, gelatin, or the like.

Several natural fibrous materials may be used in combination both as structural elements (at several size scales) in the baked items and or as inexpensive organic fillers. Fiber elements are used both to control the molding characteristics of the wet batter and to enhance the structural stability of the finished food service articles. Although there is a continuum of fiber lengths and fiber aspect ratios used in the formulation, the fibrous portion of the formulation can be in a general sense separated into three classes (based on fiber length) that serve different functions. Long or very long (about 4 to 25 mm or longer) fibers or composite fiber elements are used to form a meshwork that helps prevent defects from forming in the batter as it expands in the mold. Medium-length fibers (about 0.5 to 5 mm) also help control the flow characteristics of the wet batter, and serve to increase the toughness of the finished food service articles, preventing fracture during handling and during normal use. Short fibers (<0.5 mm) serve mainly as a means to introduce readily biodegradable material into the formulation, i.e., filler material that is more water-resistant than the starch-based matrix that contains them. (All types of fiber provide this functionality, but the presence of the medium, long, and very long fibers are required for the strength, molding, handling and usage characteristics they provide, whereas the short fiber elements are present primarily for the contribution to water-resistance that they make.)

Optionally, the shorter fibers may be used in conjunction with, or replaced by other filler materials imparting the same advantages as the shorter fibers. The concentration of fillers and/or short fibers may be in a range from about 0% to about 25% by dry weight of the formulation, in a range from about 2.5% to about 20% by total dry weight of the formulation, in a range from about 5% to about 15% dry weight of the formulation, in a range from about 5% to about 20% by total dry weight of the formulation, or in a range from about 7% to about 17% dry weight of the formulation.

In one aspect of the present embodiment, the organic filler material may include ground walnut shells. Grounding walnut shells results in fibrous mater comprising short fibers. The ground walnut shells may be used alone as the filler material or may be combined with other filler materials. When used alone the preferred concentration is about 8% by dry weight. Other short fibrous materials include ground wood, powdered cellulose (from multiple sources), ground pulp, ground rice husks, ground coconut shells and husks and the like. The preferred organic filler will be free of major allergenic proteins.

Fibers from several sources are typically included in the formulation. Relatively high quality fibers from grass or reed species provide the mid-length fibers that contribute most to the structural stability and resilience if the finished articles. The long to very long fibers or fiber composites may come from lightly processed agricultural byproducts, e.g., stalk or husk materials that have been chopped, ground, or milled to an appropriate size. Under appropriate processing conditions (e.g., hammer milling), these materials can also provide a considerable amount of the very short fiber that serves to replace starch and add water resistance to the finished article. Fibrous material in the form of ground nut shells (or other very hard, lignin-rich plant materials) may also serve as organic, relatively water resistant, biodegradable fibers that replace conventional filler materials.

Moreover, these other sources of fiber suitable as structural elements in starch-based food service articles are readily available. Some of these are from fast-growing plants that can be broadly characterized as grasses or reeds, such as kenaf and bamboo, which provide fiber with smaller associated environmental costs than taking fiber from trees. A growing segment of the fiber industry is based on the use of fiber from these plants. In many cases the quality and consistency of fibers taken from these plants (after processing) is as good as that provided by the wood pulp industry. In addition, fiber is also widely available as a by-product of agricultural production. Stalks, stems, and husks from cereal grains, for example, are a ready source of fibrous material that, while not as high in quality as the fiber taken from wood or the better grass species, is extremely cheap and, as a by-product, has essentially no additional environmental cost (beyond whatever environmental costs are associated with the production of the main crop).

The fibrous materials included in the formulations described here vary greatly in both fiber length and fiber aspect ratio. However, it is preferred that the materials have an average fiber length that is less than about 2 mm and an average aspect ratio that is in the range of about 5:1 to 25:1.

In some embodiments, additives, alone or in combination, may be incorporated in a composition such as the compositions set forth above or the compositions set forth in U.S. patent application Ser. No. 10/928,602, filed Aug. 26, 2004, U.S. patent application Ser. No. 11/285,508, filed Nov. 21, 2005, U.S. patent application Ser. No. 12/168,049, filed Jul. 3, 2008, which are incorporated herein by reference in their entirety. The compositions can be modified to preserve certain desirable properties, such as viscosity, by modification of the formulations through, e.g., increasing water or decreasing fillers to compensate for the inclusion of other desirable additives a set forth herein. The additives include, but are not limited to metals, metal oxides, metal sulfides, carbon-based materials, and preservatives. The additives may or may not be biodegradable, compostable or edible, and may be added in various forms, such as flakes, powder, colloids, solutions, or any other appropriate form.

Depending upon the particular additive and desired properties of the final product, the concentration of one or more additives may be in a range from about 0% to about 25% by dry weight of the formulation, in a range from about 2.5% to about 20% by total dry weight of the formulation, in a range from about 5% to about 15% dry weight of the formulation, in a range from about 5% to about 20% by total dry weight of the formulation, in a range from about 7% to about 17% dry weight of the formulation, or about 10% by total dry weight of the formulation.

In some embodiments, additives are added to improve heat transfer of the composition. Examples of additives that may improve heat transfer are the following metals including aluminum (Al), iron (Fe), copper (Cu), cobalt (Co), manganese (Mn), nickel (Ni), silver (Ag), tungsten (W), zinc (Zn), zirconium (Zr), molybdenum (Mo), and vanadium (V), and their oxides. In some embodiments, the metal oxide may include alumina ($Al_2O_3$), magnetite ($Fe_3O_4$), hematite ($Fe_2O_3$), copper oxides, including CuO, cobalt oxides including $Co_2O_3$, nickel oxides including NiO, manganese oxides including $MnO_2$, and tungsten oxides including $WO_3$. In some embodiments, the metal or metal oxide is added at a concentration of approximately 2% to 12%. Other examples of additives that may improve heat transfer are metal sulfides including pyrite (FeS), galena (PbS), chalcopyrite ($CuFeS_2$), chalcocite ($Cu_2S$) and others including silver sulfide ($Ag_2S$), and carbon-based materials and nanomaterials such as carbon black, graphite, graphene, carbon fibers and carbon nanotubes. Additive that are conductive are also useful to increase the static dissipative and electromagnetic shielding properties of formed articles.

Some additives that improve heat transfer and/or that can act as microwave susceptors are particularly suited for microwave applications. These include the metal oxides such as NiO, $MnO_2$, $Co_2O_3$, CuO, $WO_3$, and $Fe_3O_4$ (magnetite), metal sulfides including natural minerals including pyrite (FeS), galena (PbS), chalcopyrite ($CuFeS_2$), chalcocite ($Cu_2S$) and others including silver sulfide ($Ag_2S$). Metals themselves, including Al, Co, Cu, Fe, Mo, Zn, Zr, W and V, also improve heat transfer.

Unexpectedly, it was found that the use of metals did not cause sparking or other undesirable effects when microwaved. Without limitation to a particular theory, it is believed that with proper dispersion of the additive, the additive is partially or substantially enveloped by the starch of the starch based matrix preventing such effects.

In some embodiments, additives are added to impart oxygen scavenging properties to the composition and articles formed there from. In one embodiment, metallic iron powder is used as an additive that improves oxygen scavenging. Various salts are known to be used with iron powder to catalyze the reaction with oxygen and increase the rate of oxygen scavenging. For example, potassium chloride, sodium chloride, sodium sulfate, sodium carbonate, iron (II & III) chloride, calcium sulfate, calcium carbonate, calcium hydroxide, calcium chloride, magnesium chloride, magnesium sulfate, magnesium carbonate, magnesium hydroxide, and the like. Also used to catalyze the reaction are acidic components such as citric acid, maleic acid, tartaric acid, phosphoric acid, meta phosphoric acid and their sodium or potassium salts. Ascorbic acid, erythorbic acid and their salts are good oxygen scavengers in their own right and can act as catalysts for iron oxidation as well. The most preferred catalytic components will be hygroscopic due to the somewhat hygroscopic nature of a starch based matrix which makes it an ideal carrier for moisture activated oxygen scavenging compositions.

Additional oxygen scavenging compositions that can be incorporated into a starch based composition are disclosed in U.S. Pat. No. 5,798,055, U.S. Pat. No. 5,941,037, U.S. Pat. No. 5,977,212, U.S. Pat. No. 6,387,461, and U.S. Pat. No. 6,592,919, which are incorporated by reference as if set forth in full.

In another embodiment, metallic zinc, copper and iron as well as their oxides may be used alone or in combination as an additive that scavenges odorous sulfur compounds such as hydrogen sulfide and mercaptans. Particularly preferred sulfur scavengers are zinc and copper oxide. Sulfur scavengers described in U.S. Pat. No. 7,241,481, which is incorporated herein in full, may be used with this starch based composition.

In some embodiments, additives may be added to improve the anti-microbial properties of the composition. These additives may also improve heat transfer or other properties. In one embodiment, silver colloids and/or silver powder may be used to combat bacterial growth as well as improve heat transfer of the composition.

In some embodiments, additives may be included to improve the shelf life of the composition. Additives that may be used include, but are not limited to, preservatives used in foods, e.g., anti-microbial preservatives such as calcium propionate, methylparaben, propylparaben, sodium nitrate, disodium EDTA and sulfides including sulfur dioxide, sodium bisulfite, sodium sulfite, and potassium hydrogen sulfite; antioxidants such as butylated hydroxyanisole (BHA), propyl gallate and butylated hydroxytoluene (BHT); and other preservatives such as formaldehyde, gluteraldehyde, ethanol and methylchloroisothiazolinone.

The preferred wax emulsions of the formulation, used to increase water-resistance, is a stable aqueous emulsion usually made of carnauba, candelilla, rice bran, paraffin, hydrogenated triglycerides, or any other food-grade wax: vegetable waxes are preferred over animal and mineral waxes, and natural waxes are preferred over synthetic varieties. The wax type is selected based on the particular application and desired properties of the final product. In some embodiments, hydrogenated vegetable oil with a melting point of between about 54° C. and 85° C. can be used in place of the wax to improve the moisture resistance of the formulation. Suitable hydrogenated triglycerides can be prepared from animal or vegetable fats and oils such as tallow, lard, peanut oil, soybean oil, canola oil, corn oil and the like. Suitable hydrogenated vegetable oils include those available from EvCo Research under the trade names EVCOPEL EVCORR, and EVCOPEL EVCEAL. In some embodiments, the hydrogenated triglycerides are used in concentrations of up to 5%. The hydrogenated triglyceride can be added to the formulation in the form of a solid powder, melt, or as an emulsion. The wax emulsion is usually prepared by means of emulsifying agents and mechanical agitation. Examples of wax emulsions suitable for use in the present formulation include emulsified carnauba wax and emulsified candelilla wax. Emulsifiers include all of those permitted for food applications, including (but not limited to) sorbitan monostearate, Polysorbate 60, Polysorbate 65, Polysorbate 80, food-grade gums (e.g., arabinogalactan, carrageenan, furcelleran, xanthan), stearyl monoglyceridyl citrate, succistearin, hydroxylated lecithin, and many other compounds.

A mold release agent, or abherent, is provided to reduce adhesion between baked parts and the mold system. Examples of specific mold release agents that are suitable for use in the present formulation include, but are not limited to metal stearate compounds (e.g., aluminum, magnesium, calcium, potassium, sodium, or zinc stearates), fatty acids (e.g., oleic acid, linoleic acid, etc.) fats, oils, or similar materials, or a combination of any of the foregoing.

The coloring agents preferred for use in the present formulation are water insoluble pigment types considered safe for use in food products (e.g., iron oxides, ultramarines, chromium-cobalt-aluminum oxides, ferric ammonium ferrocyanide, ferric ferrocyanide, manganese violet, carbazole violet). Alternatively, aluminum lake colorants, water-soluble food dyes, and combinations of pigments, or combinations of pigments with lakes and/or dyes may be used for some applications.

Containers fashioned from a mix formulation according to some embodiments can be of varying shape and thickness depending upon the desired use for, and properties of, the final container. For example, the containers may be fashioned into open containers such as trays, cones, pie plates, cups, or bowls, or any other useful configuration known in the art.

Further, the thickness of any portion of the container will preferably vary in the range from about 0.5 mm to about 3.2 mm, and more preferably from about 1.5 mm to about 3.0 mm, and most preferably from about 1.6 mm to about 2.5 mm. The thickness of the containers may also vary across the cross-section of the container.

In another embodiment, a biodegradable material such as an edible coating and or sealant may be applied to containers fashioned from the mix formulation. Said biodegradable material may be applied such that it permeates the inner and/or outer surfaces of the container, thereby improving water and heat resistant properties of the container. Said materials when applied as a coating, may partially or completely permeate the container matrix or a combination of a forming a coating and partially or completely permeating the container matrix.

A further embodiment, include methods to produce a container or other article for use with food or beverage containers. Said method comprises providing the mix formulation set forth above; heating said mix in a mold of desired shape to form a container of a corresponding desired shape. Said method may further comprise steps set forth in U.S. patent application Ser. No. 10/608,441, filed Jun. 27, 2003, which, by reference, is incorporated herein in its entirety.

A further method according to the present invention comprises the steps of providing a mold apparatus having a cavity in the shape of a desired final product and a gap or gaps for venting vapor from the mold apparatus produced during heating or baking, heating or baking the mold apparatus, adding a mixture that is liquid or semi-liquid to the cavity of the mold apparatus prior to closing the mold apparatus and closing the mold apparatus, wherein as vapor or steam is produced in the cavity during heating or baking, the mixture is pushed by vapor or steam pressure to completely fill the cavity, and upon sufficient contact of the mixture to the heated mold apparatus a skin forms on the outer surface of the mixture, the skin being permeable or semi-permeable to the vapor or steam and the skin and gap being such that, in combination, they allow escape of steam or vapor from the cavity to the exterior of the mold apparatus but do not allow any significant amount of the mixture to escape. "Any significant amount of mixture" as referred to herein is any amount the loss of which would cause any one of the drawbacks found in the prior art in a meaningful amount, such as waste of raw materials, waste of energy needed to heat additional mixture, additional processes to remove excess material to form the final product and clogging of the gap or gaps.

The vapor escapes while the mixture is retained in the cavity because the gap is of sufficiently small size that the skin formed on the surface of the mixture from contact of the mixture with the heated mold surface, when under sufficient pressure from the steam or vapor produced during heating or baking of the mixture, allows the steam or vapor to escape through the skin and then through the gap to the exterior of the mold apparatus without rupture of the skin. Because the skin is not permeable to the mixture, which may still be liquid or semi-liquid prior to the completion of heating or baking, the mixture cannot escape from the cavity of the mold apparatus.

The aforementioned method according to the present invention allows for venting of the vapors produced during baking without significant loss of mixture and the associated drawbacks of said loss outlined above such as waste of raw materials, waste of energy needed to heat additional mixture, additional processes to remove excess material to form the final product and clogging of the gap or gaps.

The aforementioned method according to the present invention may be used to manufacture both edible baked goods and other baked products such as starch-based materials for use as food containers and the like. Mixtures for use in said method are typically water-based and include mixtures as described herein. One skilled in the art, however, will recognize that the mixtures need not be water-based, such as alcohol-based mixtures or other non-water-based mixtures. Specific examples of mixtures that may be used said method should be readily apparent to one skilled in the art and include, but are not limited to, common baking mixtures such as waffle, cookie dough, or ice cream cone batter, starch-based mixtures comprised of starch and water and mixtures comprising composite materials mixed with resins that form skins which are still permeable to the gases produced during heating or baking. Further, specific baking procedures such as heating temperature and time will vary depending upon the specific mixture to be heated or baked and should be apparent to one skilled in the art.

Although the invention has been described with respect to specific embodiments and examples, it will be readily appreciated by those skilled in the art that modifications and adaptations of the invention are possible without deviation from the spirit and scope of the invention. Accordingly, the scope of the present invention is limited only by the following claims.

The invention claimed is:

1. A composition for use in making a biodegradable and microwavable food container comprising:
   water;
   starch, wherein the starch comprises pregelatinized and native starch and wherein the pregelatinized starch is in a range from more than 0% to less than 30% by weight of the total starch in the composition;
   fibers, wherein a dispersion of the composition is such that the fibers are substantially separated from one another throughout a starch based matrix; and
   a metal or metal oxide, wherein the metal or metal oxide is substantially dispersed throughout the composition such that the metal or metal oxide is partially or substantially enveloped by the starch of the starch based matrix to prevent sparking when microwaved and wherein the metal or metal oxide is in a range from more than 0% to less than 25% by dry weight of the composition wherein the dry weight of the composition is the total weight of the non-water components thereof.

2. The composition of claim 1 wherein the metal is selected from the group consisting of aluminum, iron, copper, cobalt, manganese, nickel, silver, tungsten, zinc, zirconium, molybdenum, and vanadium.

3. The composition of claim 1 wherein the metal or metal oxide is in a range from more than 5% to less than 15% by dry weight of the composition.

4. The composition of claim 1 wherein the metal or metal oxide is about 10% by dry weight of the composition.

5. A composition for use in making microwavable food containers comprising:
   water;
   starch, wherein the starch comprises pregelatinized and native starch and wherein the pregelatinized starch is in a range from more than 0% to less than 30% by weight of the total starch in the composition;
   an insolubilizing compound, wherein the insolubilizing compound comprises an aqueous solution comprising polyamide-epichlorohydrin compounds;
   fibers, wherein a dispersion of the composition is such that the fibers are substantially separated from one another throughout a starch based matrix;
   a wax;
   a mold release agent; and
   a metal or metal oxide wherein the metal or metal oxide is substantially dispersed throughout the composition such that the metal or metal oxide is partially or substantially enveloped by the starch of the starch based matrix to prevent sparking when microwaved and wherein the metal or metal oxide is in a range from more than 0% to less than 25% by dry weight of the composition wherein the dry weight of the composition is the total weight of the non-water components thereof.

6. The composition of claim 5 wherein the metal is selected from the group consisting of aluminum, iron, copper, cobalt, manganese, nickel, silver, tungsten, zinc, zirconium, molybdenum, and vanadium.

7. A composition for use in making biodegradable and microwavable food containers comprising:
   water;
   starch comprising pregelatinized and native starch wherein the pregelatinized starch is in a range from more than 0% to less than 30% by weight of the total starch in the composition;
   an insolubilizing compound comprising an aqueous solution comprising polyamide-epichlorohydrin compounds;
   natural fibers, wherein a dispersion of the composition is such that the fibers are substantially separated from one another throughout a starch based matrix; and
   a metal or metal oxide wherein the metal or metal oxide is substantially dispersed throughout the composition such that the metal or metal oxide is partially or substantially enveloped by the starch of the starch based matrix to prevent sparking when microwaved and wherein the metal or metal oxide is in a range from more than 0% to less than 25% by dry weight of the composition wherein the dry weight of the composition is the total weight of the non-water components thereof.

8. The composition of claim 7 wherein the metal is selected from the group consisting of aluminum, iron, copper, cobalt, manganese, nickel, silver, tungsten, zinc, zirconium, molybdenum, and vanadium.

9. A composition for use in making a biodegradable and microwavable food container comprising:
water;
starch, wherein the starch comprises pregelatinized and native starch;
fibers; and
a heat transfer compound wherein the heat transfer compound is substantially dispersed throughout the composition such that the heat transfer compound is partially or substantially enveloped by the starch of the starch based matrix to prevent sparking when microwaved and wherein the heat transfer compound is in a range from more than 0% to less than 25% by dry weight of the composition wherein the dry weight of the composition is the total weight of the non-water components thereof.

10. The composition of claim 9 wherein the heat transfer compound is substantially dispersed throughout the composition.

11. The composition of claim 10 wherein the heat transfer compound comprises a metal or oxide or sulfide thereof.

12. The composition of claim 11 wherein the metal is selected from the group consisting of aluminum, iron, copper, cobalt, manganese, nickel, silver, tungsten, zinc, zirconium, molybdenum, and vanadium.

13. The composition of claim 12 wherein the metal or metal oxide is in a range from more than 5% to less than 15% by dry weight of the composition.

14. The composition of claim 12 wherein the metal or metal oxide is about 10% by dry weight of the composition.

15. A composition for use in making biodegradable and microwavable food containers comprising:
water;
starch comprising pregelatinized and native starch wherein the pregelatinized starch is in a range from more than 0% to less than 30% by weight of the total starch in the composition;
an insolubilizing compound comprising an aqueous solution comprising polyamide-epichlorohydrin compounds;
natural fibers, wherein a dispersion of the composition is such that the fibers are substantially separated from one another throughout a starch based matrix; and
a heat transfer compound wherein the heat transfer compound is substantially dispersed throughout the composition such that the heat transfer compound is partially or substantially enveloped by the starch of the starch based matrix to prevent sparking when microwaved and wherein the heat transfer compound is in a range from more than 0% to less than 25% by dry weight of the composition wherein the dry weight of the composition is the total weight of the non-water components thereof.

16. The composition of claim 15 wherein the heat transfer compound is selected from the group consisting of metal oxides, metal sulfides, and metals.

17. The composition of claim 15 wherein the heat transfer compound comprises a metal oxide.

18. The composition of claim 17 wherein metal oxide is selected from the group consisting of NiO, $MnO_2$, $Co_2O_3$, CuO, $WO_3$, and $Fe_3O_4$.

19. The composition of claim 15 wherein the heat transfer compound comprises a metal sulfide.

20. The composition of claim 17 wherein the metal sulfide is selected from the group consisting of pyrite (FeS), galena (PbS), chalcopyrite ($CuFeS_2$), chalcocite ($Cu_2S$), and silver sulfide ($Ag_2S$).

21. The composition of claim 15 wherein the heat transfer compound comprises a metal.

22. The composition of claim 17 wherein the metal is selected from the group consisting of Al, Co, Cu, Fe, Mo, Zn, Zr, W and V.

23. The composition of claim 15 wherein the metal or metal oxide is in a range from more than 5% to less than 15% by dry weight of the composition.

24. The composition of claim 15 wherein the metal or metal oxide is about 10% by dry weight of the composition.

* * * * *